June 6, 1950     C. CHILOWSKY     2,510,800
METHOD AND APPARATUS FOR PRODUCING ELECTRICAL
AND MECHANICAL ENERGY FROM THERMAL ENERGY
Filed Nov. 10, 1945     3 Sheets-Sheet 1
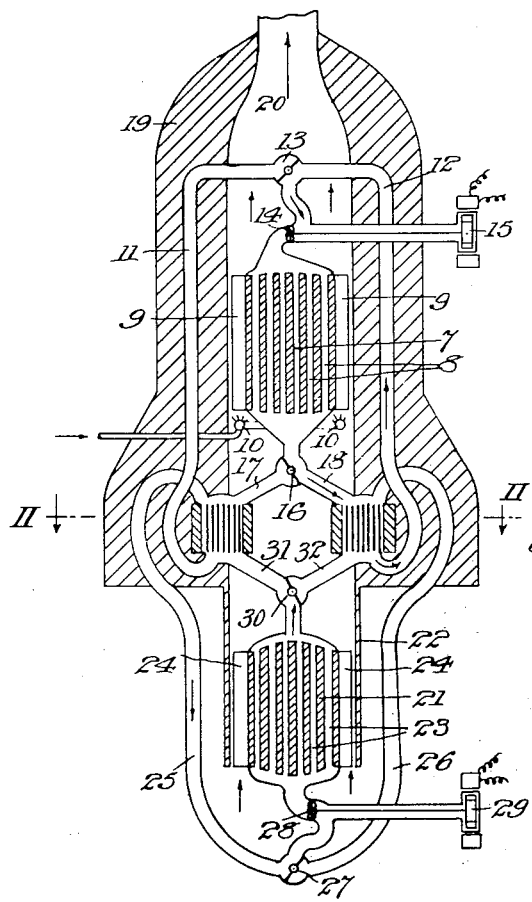
Fig. 1.
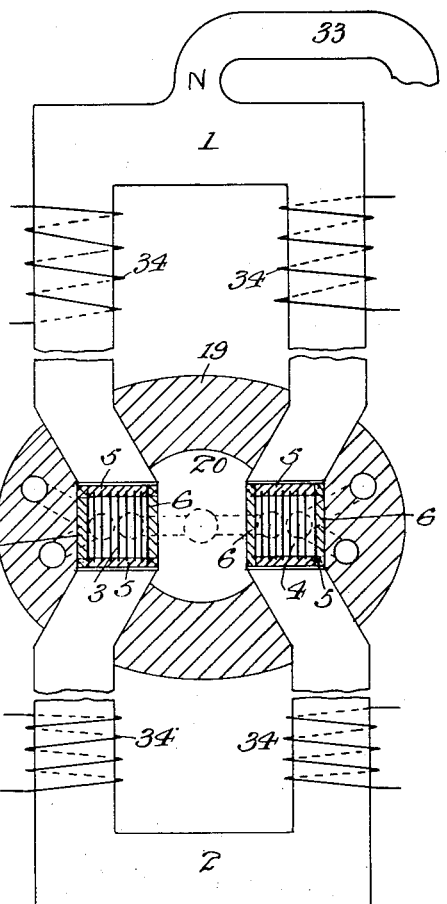
Fig. 2.
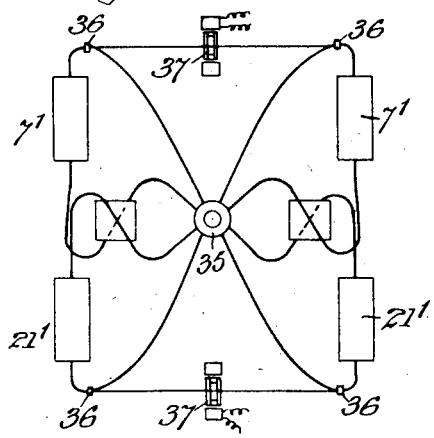
Fig. 3.
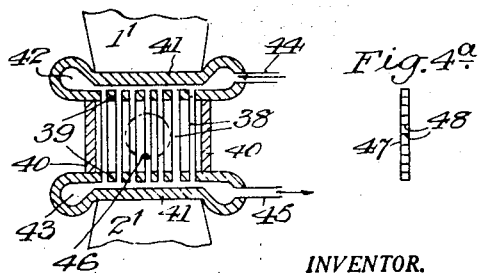
Fig. 4.    Fig. 4ª.
INVENTOR.
Constantin Chilowsky
BY
Brown + Award
ATTORNEYS

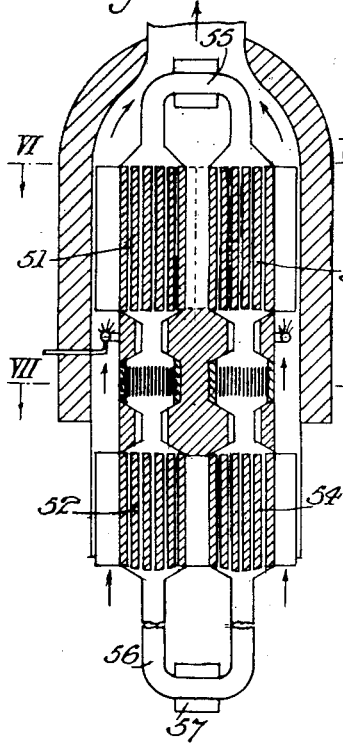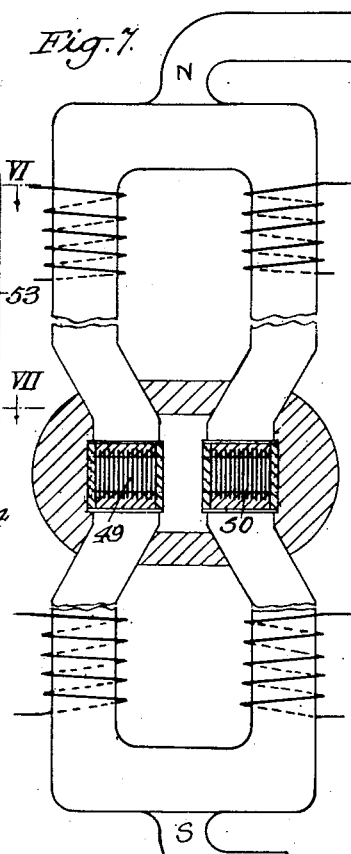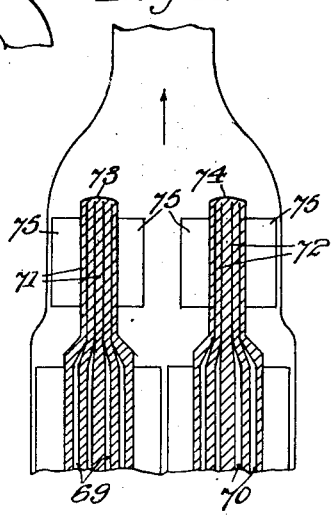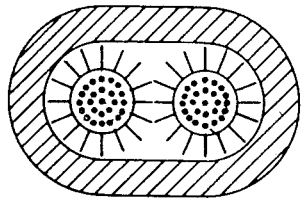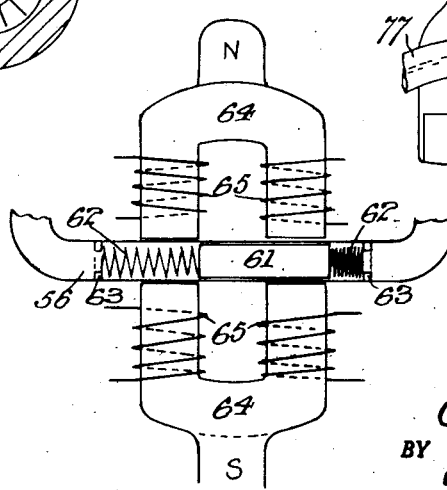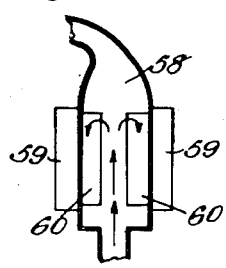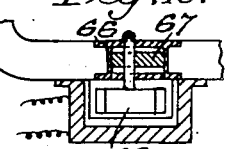

June 6, 1950             C. CHILOWSKY             2,510,800
METHOD AND APPARATUS FOR PRODUCING ELECTRICAL
AND MECHANICAL ENERGY FROM THERMAL ENERGY
Filed Nov. 10, 1945            3 Sheets-Sheet 3
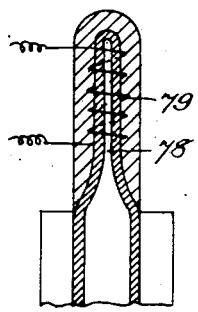
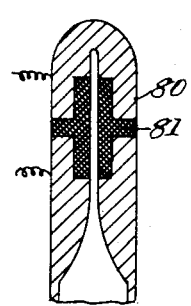
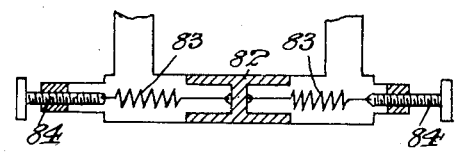
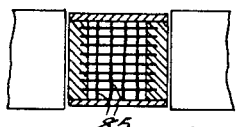
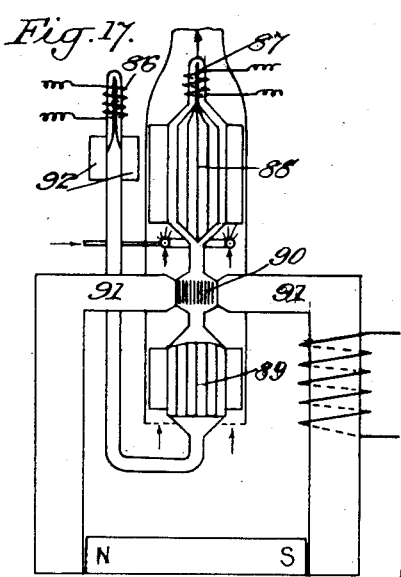
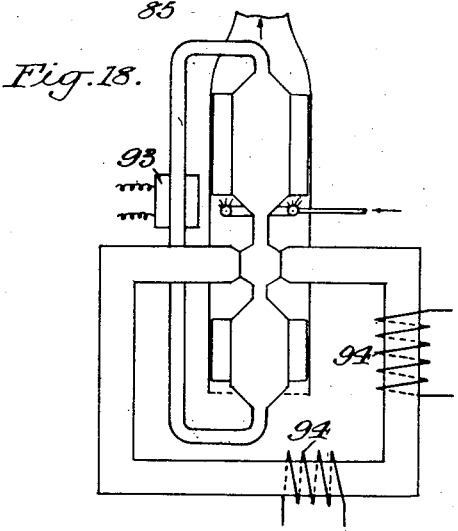
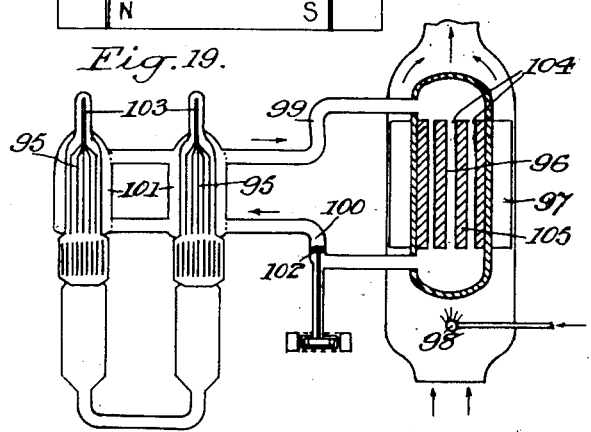
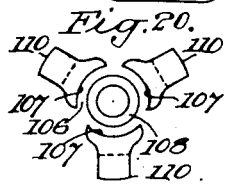
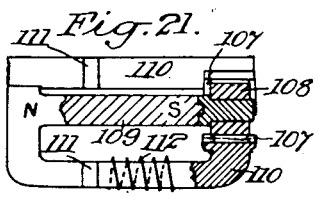
INVENTOR.
Constantin Chilowsky
BY
Brown & Oward
ATTORNEYS Patented June 6, 1950

2,510,800

UNITED STATES PATENT OFFICE 2,510,800

METHOD AND APPARATUS FOR PRODUCING ELECTRICAL AND MECHANICAL ENERGY FROM THERMAL ENERGY

Constantin Chilowsky, New York, N. Y.

Application November 10, 1945, Serial No. 627,832

9 Claims. (Cl. 171—125)

This invention relates to a method and apparatus for producing electrical and mechanical energy from thermal energy.

It is known that paramagnetic bodies, and particularly the ferromagnetic bodies, such as iron, nickel, cobalt and certain special alloys (characterized by great magnetic permeability), keep the greater part of their magnetic properties up to a certain critical temperature, called the Curie point, and above this point become non-magnetic (or only slightly magnetic) on losing its permeability. The temperature of the Curie point for iron is 769° C., for nickel 360° C. and for cobalt 1137° C.

The present invention has for its object a method and apparatus for the transformation of thermal energy into mechanical, and particularly electrical energy, by utilizing the above explained phenomena, occurring in the neighborhood of the Curie point.

Most particularly, the invention envisages the direct transformation of heat into electrical energy without requiring—for the production of the electric current—a mechanical movement.

The invention also provides for a special mode of heating and cooling the ferromagnetic matter, through the intermediary of a metallic fluid in the form of molten or liquid metal or alloy, or in the form of metallic vapor. This mode of heating permits particularly to make this procedure compact and commercially practical. The heating and cooling of the system by means of a metallic fluid and particularly of a metallic liquid has, as will be shown hereinafter, a very great advantage.

According to the invention, the energy is transformed into alternating electric current in a static transformer. For that purpose, a closed magnetic circuit is provided, for instance in super imposed sheet-iron plates, as in an ordinary transformer. This closed magnetic ring includes one or more transverse sections or segments (consisting of the same or other ferromagnetic material) arranged in such a manner as to be able to be quickly heated and cooled by the passage of an appropriate fluid, now warmer, now colder, than the Curie point.

This rapid variation of the section's temperature, above and below the Curie point, produces a rapid variation of the magnetic resistance of the circuit.

By means of a winding, through which flows an electric current developing a magnetomotive force, an intense magnetic flux is induced in this iron ring. The periodic variation of the section's temperature above and below the Curie point, accompanied by the appearance and disappearance of its magnetic properties (permeability), causes the magnetic resistance of the ring and the magnetic flux flowing through it to vary periodically to a great extent. This induces a magnetomotive force and an alternating current in the winding of the ring. If necessary, a part of this electric current can be used to produce or to maintain the initial magnetic flux in the ring.

Preferably, however, the initial magnetic flux will be maintained in the ring by the use of a powerful permanent magnet. The two poles of such a magnet may be applied to symmetrical points of the magnetic ring, and the ring may have two transverse sections for the heating, located at two points of the ring, symmetrical in relation to the points of application of the poles of the magnet.

The two interrupter sections are alternatively heated and cooled, with a phase difference of time between them of 180°. The magnetic flux furnished by the permanent magnet, in branching off between the semi-circles of the ring inversely to their relative magnetic resistances, will tend to concentrate itself in the circuit of least resistance, containing momentarily the section heated to a temperature below the Curie point. The magnetic flux will thus pass from one branch of the ring to the other, and return, with the frequency of the cycle of heating and cooling of the sections, thus producing in the windings of the ring a two-phase alternating current.

Thus a generator of alternating electric current is obtained, which is similar to existing transformers, but with the difference that in the usual transformer the variation of the magnetic flux is produced by a primary electric current, while in the new generator this variation of the flux is produced by the action of thermal energy, periodically varying or interrupting the flux.

It is evident that on the basis of these principles it will be possible to produce also three-phase or multi-phase currents.

The variations of the magnetic flux may be considerable. Thus, for instance, a total thickness of the interrupter section of 2 mm., heated above the Curie point, is able to reduce the magnetic flux down to one third of its initial value.

The heating and the cooling of the sections will be effected, preferably, by two fluids, one hot (above the Curie point), the other "cold" (below the Curie point), these two fluids acting alternatively on the section.

In principle, any fluid may be utilized for this heating and cooling operation. For instance, the heating may be effected by the combustion products of a fuel, and the cooling by air. But this will have the disadvantage of oxidation and of rapid destruction of the heating surfaces of the sections. Better heating and cooling results will be achieved by circulating, in a closed circuit, a fluid that is chemically inert and does not affect the heated metallic surfaces. In particular, the rare gases, such as helium, argon, neon, etc., may be used (under pressure). Such a gaseous fluid, used for the heating, may be heated by a fuel in an appropriate heat-exchanger, and the fluid, used for the cooling, may be cooled by air or by water or simply by radiation in a heat-exchanger.

However, only the use of metallic liquids, and most particularly of alkaline metals (sodium, potassium, and their alloys and lithium) represents a practical industrial solution of the heating and cooling problem. For instance, the molten sodium, due to its high specific heat (about 0.3), its relatively great thermal conductivity, its small density (in the neighborhood of 1.0), its high boiling point (880° C.) and its chemical passivity in regard to iron and to nickel, permits transferring to, or removing from, the laminae of the interrupter section very great amounts of heat within a very short time with a minimum of thermal gradient and with a minimum of pressure necessary to move the fluid. In certain cases, molten lead, fusible molten alloys, for instance, lead and bismuth, etc., or the metallic vapors of sodium, potassium and mercury, under pressure, can also be used.

The interrupter sections consist generally of thin laminae of ferromagnetic substance, (e. g., soft iron) arranged parallel to each other in the direction of the magnetic lines of force. The heating and cooling fluids pass between the laminae, preferably perpendicularly to the magnetic field. The thickness of the ferromagnetic lamina may vary between 0.1 mm. and 1 mm., and if necessary, up to the usual thickness of the sheet iron plates forming the magnetic core of the generator. Means are also provided for reducing the thickness of the laminae even below 0.1 mm.

The above described combination of heating and cooling by metallic liquids or fluids, with lamination of the ferromagnetic interrupter sections, insures the possibility of producing electric currents of industrial (commercial) frequency of 50 cycles and even more.

The produced alternating current may be utilized to insure and control the operation and automatic synchronization of the distributors, valves and other parts (or mechanisms) insuring the alternation of circulation of the cold, and hot, liquids between the laminae. But it is also provided that the desired frequency may be imposed by any mechanical or electric apparatus, possessing its own constant frequency of oscillation and that said apparatus will impose its frequency on the said distributors.

The invention also provides for the utilization of the same methods of lamination of ferromagnetic material and its alternative cooling and heating (particularly by means of metallic fluids), to transform heat into mechanical energy of movement and particularly of rotation.

Practical embodiments of the invention are represented in the drawings, in which:

Fig. 1 represents a vertical section through a typical form of generator;

Fig. 2 represents a horizontal section, partly in plan, taken on the line II—II of Fig. 1, on an enlarged scale;

Fig. 3 represents diagrammatically a modified fluid circuit arrangement;

Fig. 4 represents, in horizontal section, a detail modification of the interrupter section;

Fig. 4a represents, in section, a detail of part of an interrupter section;

Fig. 5 represents a vertical section, corresponding to Fig. 1, of a modified form of generator;

Fig. 6 represents a horizontal section, taken on the line VI—VI of Fig. 5;

Fig. 7 represents a horizontal section, partly in plan, corresponding to Fig. 2, taken on the line VII—VII of Fig. 5;

Fig. 8 represents a vertical detail section of modified form of fluid heater;

Fig. 9 represents a vertical detail section, partly in elevation, of a form of fluid column oscillating means;

Fig. 10 represents a vertical detail section of a modified form of fluid column oscillating means;

Fig. 11 represents a vertical detailed section of a thermally operated oscillating means;

Fig. 12 represents a vertical detail section of a modified form of the means shown in Fig. 11;

Figs. 13 and 14 represent vertical detail sections of other forms of said means;

Fig. 15 represents a vertical detail section of an oscillation frequencer regulator;

Fig. 16 represents a modification of the detail shown in Fig. 4;

Figs. 17 and 18 represent vertical sections, partly in elevation, of generators having a single transverse interrupter section;

Fig. 19 represents a vertical section of a generator in which the primary heating and cooling liquid is heated by circulation of a secondary heating liquid;

Fig. 20 represents a detail elevation of the rotor end of a thermomagnetic motor, and Fig. 21 represents a longitudinal section on the line XXI—XXI of Fig. 20.

It will be understood that the drawings are largely diagrammatic and do not purport to show all conventional structural details.

In the generator shown in Figs. 1 and 2, the ferromagnetic armature comprises symmetrical parts 1, 2, shown as generally U-shaped, and having their ends connected by transverse sections 3, 4 made up of slightly spaced parallel thin laminae (preferably of iron) set in magnetic supports 5 and faced on the outside by non-magnetic covers 6 (Fig. 2). The sections 3, 4 are open on two faces for the circulation of heating and cooling fluids through the circuits shown in Fig. 1. In this figure a heater 7 is shown as a block of heat-conductive metal traversed vertically by narrow channels 8 and provided with fins 9 for picking up heat from the burners 10, to which gas or the like fuel is supplied from a source not shown.

The fluid circuit system from the sections 3, 4 includes the pipes 11, 12, the distributor 13, the propeller 14 (which may be driven by a hermetically sealed magnetic motor 15 suitably placed at a point outside the generator), the channels 8, a second distributor 16 and pipes 17, 18 leading back, respectively, to the sections 3, 4; this system being adapted to supply fluid, heated in the channels 8 to a temperature above the Curie point of the laminae in sections 3, 4, alternately to said sections according to the operation of the distributors 13 and 16. The system just described is enclosed within a thick, heat-insulating casing 19 having a central vertical passage 20.

A cooler 21, similar in construction to the heater 7, is located in the lower part of the passage 20 within a thin-walled extension 22 of the casing, the cooler being provided with channels 23 and fins 24. The cooling fluid circuit system from the sections 3, 4 includes the pipes 25, 26, the distributor 27, the propeller 28 (driven by a motor 29), the channels 23, a second distributor 30, and pipes 31, 32 leading back, respectively, to the sections 3, 4; this system being adapted to supply fluid, cooled in the channels 23 to a temperature below the Curie point of the laminae, alternately to the sections 3 and 4 as determined by the distributors.

In operation, the propellers 14 and 28 are driven continuously by their motors, and the distributors 13, 16, 27 and 30 are actuated simultaneously to cause fluid from the cooler 21 to flow through one of the sections 3 or 4 while fluid from the heater 7 is flowing through the other of said sections, the distribution of both fluids being alternated between said sections with the desired frequency.

The armature 1, 2, 3, 4 is shown as being polarized, for instance, by association with a powerful permanent magnet 33 (Fig. 2) and the several sides of the armature are provided with windings 34. When the magnetic permeability of the sections 3, 4 is interrupted by heating the laminae in said sections above the Curie point, the magnetic flux in the corresponding side of the armature is modulated and electric current is induced in the winding thereof; the alternate heating and cooling of the sections 3 and 4 thus producing alternating current in said windings, with a frequency corresponding to the frequency of the temperature changes. This frequency may be constant or may be changed almost instantly when desired.

The arrangement of the heater 7, cooler 21 and passage 20 is such that cooling air is drawn past the fins 20 where it picks up a certain amount of heat before passing on to the burners 10 which add sufficient heat to maintain the heater (and fluid in the channels 8 thereof) at a temperature above the Curie point of the laminae; the heated air passing the fins 9 and on out the top of the passage 20.

The fluid circulation system shown in Figs. 1 and 2 is subject to considerable variation, for example, as indicated in Fig. 3 where two heaters 7', 7' and two coolers 21', 21' are connected to a single central 8-way distributor 35, the fluid being moved through the several closed circuits by propellers 36 driven by motors 37.

It is evident that, by using three-branched armatures instead of two-branched as shown, with a transverse laminated interrupter section and hot-and-cold fluid supply systems in each branch, it is possible to obtain a three-phase alternating current. Other multiphase currents may be obtained, in the same manner, as will be readily understood.

If necessary a thin layer of thermal insulation may be inserted between the supports 5 and the ends of the armature parts to reduce heat losses from the laminae. The surfaces of the laminae may also be covered by very thin layers of electric insulation to reduce Foucault currents. The relative positions of the heater, cooler and interrupter sections may be varied, as by spacing the heater and cooler a convenient distance from the armature assembly and providing adequate thermal insulation for the fluid circulating systems. The several fluid conduits should have smoothly faired inner contours and cross-sections to avoid the formation of eddies.

Fig. 4 represents a horizontal section through a modified form of interrupter in which the hot and cold fluids are kept entirely separate. A large number of thin-walled iron tubes 38, preferably arranged in straight rows, are set in headers 39 and enclosed peripherally by non-magnetic walls 40. At the open ends of the tubes narrow spaces are left between the headers 39 and plates 41, which spaces communicate with peripheral channels 42, 43. The plates 41 may be in contact with the ends 1', 2' of the armature parts, providing magnetic continuity through the walls of the channels 42, 43, the headers 39 and the tubes 38. One of the fluids, for instance the hot fluid, is supplied by the conduit 44 to the channel 42, circulates through the tubes 38, channel 43 and out the conduit 45. The other fluid, for instance cold, circulates in the chamber formed by the headers 39 and walls 40, to which it may be supplied by a conduit 46, being withdrawn through a similar conduit in the opposite wall of the chamber; this fluid thus passes between the rows of tubes in contact with the outer surfaces thereof. Instead of rows of tubes, it would be possible to substitute double laminae 47 reinforced by spacers 48, as shown in Fig. 4a.

In the arrangement of Fig. 4 both liquids are constantly in contact with the walls of the tubes, but the liquids are caused to move alternately so that the walls will quickly take the temperature of the moving fluid. This result is facilitated if the spaces for fluids are made smaller than the mass of the tube walls.

Figs. 5, 6 and 7 show a form of generator in which the heating and cooling are effected by the oscillation of a single column of metallic liquid having heated and cooled parts. The armature, windings and permanent magnet of Fig. 7 correspond to those shown in Fig. 2 and transverse sections 49, 50 of laminae are provided as before. The liquid heating and cooling system includes a heater 51 and cooler 52 for liquid traversing the section 49, and a heater 53 and cooler 54 for liquid traversing the section 50, each heater and cooler being similar to those described above and shown in Fig. 1. The liquid circuit is continuous, the upper ends of the heaters being connected by a conduit 55 and the lower ends of the coolers being connected by a conduit 56. Means for oscillating the liquid column is indicated diagrammatically at 57 and it will be noted that this is in the cool part of the apparatus with obvious advantages resulting from such location. When the liquid column is oscillated by the means 57, hot liquid is drawn down from one heater to its corresponding laminar section 49 or 50 while cooling liquid is simultaneously passed up from the opposite cooler to the other section, and vice versa with a frequency of heating and cooling corresponding to the frequency of oscillation, the hot liquids being maintained always above the Curie point of the laminae and the cooling liquids being below that point, with sufficient margins to ensure efficient operation.

The laminations (or tubes, as in Fig. 4) and the spaces between them should in all cases be so dimensioned that the volume of liquid needed for heating or cooling during a half cycle is substantially greater than the volume of said spaces, in order to obtain uniformity of temperature throughout the laminations.

Fig. 8 represents a modified form of heater comprising a large chamber 58 having external fins 59 which may be heated by products of combustion from a burner (as in Figs. 1 and 5) and internal fins 60 which transmit the heat to the liquid. Efficient circulation of the liquid in the chamber can be ensured by shaping its connections to upper and lower conduits as shown, the lower connection being angular while the upper connection is smoothly conical; oscillation of the fluid through the chamber will cause eddies (indicated by the arrows) and result in thorough heating of the fluid. Such heaters may be used, for instance, in place of the heaters 51 and 53 of Fig. 5.

Details of a liquid column oscillator (57 in Fig. 5) are shown in Fig. 9. A piston or plunger 61 of magnetic material is fitted freely in the conduit 56 between springs 62, the outer ends of which may be retained by rings 63. The bifurcated armature 64 of an electro-magnet, polarized by the application of the poles of a permanent magnet, is provided with windings 65 through which alternating current may be passed, the piston 61 being thus oscillated with the frequency of reversal of the current. The natural frequency of the spring-piston-liquid column assembly should be considered in order to obtain the best results.

Another form of oscillator is shown in Fig. 10 where a piston 66 is arranged to be reciprocated by the eccentric 67 on the shaft of a motor 68.

Fig. 11 shows an arrangement in which the liquid column is oscillated by thermal energy resulting from rapidly alternating formation and condensation of metallic vapor at two closed upper ends of the column. In this case the liquid channels 69, 70 in a pair of heaters (such as heaters 51, 53 of Fig. 5) terminate above the heaters in tubes 71, 72 of relatively small cross-section with their upper ends sealed. These tubes are formed in heat-conductive heads 73, 74 provided with fins 75 which project into the stream of heated gas flowing up from the fins of the heaters. When the ratio of the heat-exchanging surfaces of the fins 75 and heads 73, 74 to the volume of liquid metal in the tubes 71, 72 is sufficiently large (and greater than the corresponding ratio in the heaters) the liquid in the tubes 71, 72 will be vaporized. If necessary, however, the super-heating of the heads 73, 74 may be assured by the provision of an additional burner 76, with its own air supply through the pipe 77, as shown in Fig. 12.

In the apparatus shown in Figs. 11 and 12, it is assumed that the liquid metal column does not completely fill the closed system in which it is contained, and that said system is evacuated. When oscillation has been initiated in any suitable manner by forcing the liquid at one end of the column to rise into the tubes 71 or 72, the liquid in said tubes will immediately be vaporized and the vapor pressure will forcefully move the column through the heaters and coolers until its other end penetrates into the other super-heating tubes, when the operation will be repeated in the opposite direction. The metallic vapor will be condensed when it passes out of the tubes and so will be in condition to be vaporized again on the following cycle. Oscillation of the column with any desired frequency, depending on the speed of vaporization, can thus be maintained automatically without the use of any moving mechanical parts.

Modified forms of super-heating tubes are shown in Figs. 13 and 14. In Fig. 13 the small tube 78 is shown as being surrounded by an electric resistance coil 79. In Fig. 14 the upper end 80 of the head is insulated from the lower part of the head by a body of refractory insulating material 81, and vaporization of the liquid metal in the tube is effected by electrical discharge through said metal between the parts of the head.

Fig. 15 shows a form of frequency regulator which may be introduced into the lower part of the liquid column. A sliding piston 82 is mounted in the liquid conduit and attached to springs 83, the tension and natural frequency of which may be regulated as by the screws 84. It will be understood that an electromagnetic oscillator of the type shown in Fig. 9 could also be used with the arrangement shown in Figs. 11 and 12.

The laminae in the transverse interrupter sections may be reinforced in various ways as by the provision of a middle layer of tungsten or tantalum, for instance, (having high strength even at elevated temperatures) between adherent surface layers of iron; or by the provision of reinforcing spacers 85 connecting the laminae and extending in the direction of flow of the heating and cooling fluids, as shown in Fig. 16.

In the apparatus described above it is preferable to use metallic liquids as the heating and cooling fluids, because of the high specific heat and conductivity of such liquids. It will be understood, however, that super-heated metallic vapors under pressure (mercury, for instance) can be used in some cases, with appropriate changes in the dimensions of the system. It would also be possible to use such rare gases as helium, neon, argon and the like, which gases are chemically inert with respect to the laminae.

In the above described cases of utilization of a permanent magnet, advantage was taken of the possibility of obtaining powerful magnetic fluxes and high magnetic fields.

But it is also possible to use, instead of a permanent magnet, a core of soft iron with windings, suitably traversed by the currents, conveniently rectified, produced by thermal interruption of the magnetic flux. It is also provided to use two separate armatures, dephased by 180°, the currents of one of the armatures, suitably dephased, acting on the magnetic flux of the other, and vice versa.

It is also possible to obtain three phase currents by using armatures with three branches and three dephased interruptions with 120° electrical angle therebetween, or three separate armatures. Other multi-phase currents could be obtained in a similar manner, as will readily be understood. For starting, the residual magnetism or a flux produced by an auxiliary starting current may be used.

It is also possible, as shown in Figs. 17 and 18, to use generators with a single interrupter section in a single armature, with or without a permanent magnet. In Fig. 17 there is an oscillating metallic liquid column maintained in oscillation by superheaters 86, 87 such as that shown in Fig. 13, one branch of the column being arranged to pass through a heater 88, cooler 89 and laminar interrupter section 90 of the armature 91. Fins 92 are provided for cooling and condensing the metallic vapors formed in the superheater 86.

Fig. 18 shows a similar arrangement (for instance, without a permanent magnet) in which the column of metallic liquid (in a closed circuit) is oscillated by an oscillator 93 similar to the one shown in Figs. 9 or 10. Windings 94 are provided for the dephased current.

In the forms of generators hereinabove described the fluid heaters, whether with continuous circulation or with oscillation of the metallic liquid column, were directly heated by the flame or products of combustion, with the inconvenient encumbrance of the several conduits in proximity to the heated laminations and the armature. The electric control of the temperature by regulating the fuel also presents difficulties due to the inertia.

In an important modification shown schematically in Fig. 19, the heaters for the liquid in circulation or in oscillation across the laminations, are heated not directly by the products of combustion but by circulation of a secondary metallic liquid in a separate circuit which includes channels in the heater or heaters, and channels in another separate reheater, called a secondary reheater. It is heated directly by the flame or by the products of combustion and can be larger, with a greater heating surface of a higher thermal output, but it does not encumber the generator itself, being connected with the primary heater or heaters by tubes with suitable thermal insulation.

Because of the rapidity of the transmission of heat in the primary heater from the secondary liquid to the primary liquid, through a wall which can be made relatively thin, the automatic temperature control of the primary liquid can be more accurate and more rapid. Actually, the control element can act, in the first place and with a rapid result, on the velocity of circulation of the secondary liquid; the temperature of the secondary liquid being capable to be controlled, with a less rapid phase, by the action of the combustion.

The same arrangement can be applied, if desired, also to the "cold" liquid. The cooling of the cold circuit can, however, be largely assured by simple thermic radiation.

In Figs. 19, 95, 95 are primary heaters for the oscillating liquid column, and 96 is a secondary reheater with fins 97, heated by the products of combustion of a burner 98. Tubes 99, 100 are provided for the closed circulation of the secondary liquid between the secondary reheater and the two primary heaters 95 which have channels or jackets 101 for passage of the secondary fluid. A propeller 102 assures the circulation of the secondary liquid and devices for assuring the oscillation of the primary circuit are indicated at 103. The secondary liquid is heated in the tubes 104 in the block 105.

If desired, this secondary circulation can be maintained by thermal syphoning. In such a case, the direction of the circulation could be reversed and the metal in the tubes 104 of the secondary reheater, circulating from the bottom to the top, could be heated to a more or less pronounced boiling.

The circulation of the metallic liquid in the secondary circuit can also take place, if desired, in the form of an oscillation, generally slower and with the volume of the displacement of the liquid being more or less equal to, or greater than, the total volumes of the two conduits and of the capacity of the primary heater or heaters.

As was indicated above, the generator can be made for a multiphase current, for instance, as a three-phase generator, using an armature with three branches, with three branches of the flux interruption, dephased by 120° between interruptions. But it is also provided to use such a system, for instance, with three interruptions, mutually dephased by 120°, for forming a magnetic rotary field, capable of entraining rotors, and also to construct electric motors, of a polyphase "thermomagnetic" type, particularly three phase.

For this purpose, in an armature of the described type with several branches, and having in each branch an interrupter section for modulating the magnetic flux with a definite frequency, a cut or space is made in each branch to provide room for placing in these spaces or recesses, and notably in the magnetic variable field thereof, the movable elements of the rotor. These cuts or spaces, forming the rotor magnetic field, will be also, in each branch, in series with the interrupter sections.

The channels of heating should be located at points in the armature branches sufficiently distant from the rotor, and this is very important, in order that the rotor and the plates of the magnetic flux in which it rotates, can be maintained at a sufficiently low temperature for an element of rotation.

The rotor should be constructed according to the particular type of the motor—synchronous, asynchronous, or other type—which may be desired and suitable for operation in a variable magnetic field.

Figs. 20 and 21 show a schematic end elevation and a corresponding longitudinal section, of a three-phase thermomagnetic motor with rotating field.

In Fig. 20, 106 is a circular section of a rotary magnetic field. 107, 107, 107 are plates constituting three poles of the rotating field. In this case of the utilization of a permanent magnet, central or axial (polarized motor), these three plates represent the same polarity (for instance, north) but of variable intensity. 108 is a piece of soft iron with the opposite polarity (for instance, south).

In Fig. 21, 109 is an axial permanent magnet. 110 is one of the three branches of the magnetic armature. 111, 111 are thermal interrupters of the magnetic flux, with heated iron laminations, alternately cooled, with dephasing of 120°. (Arrangements for heating are not shown, having already been described in detail). 112 is a winding whose electric current can be used in the rotor. The rotor, entrained by the rotary field of the gap 106, is not shown on the drawing. It can be arranged according to the type of the motor.

If desired, the part 108 can be movable and can, by itself, constitute a rotor. If desired, instead of the permanent magnet 109, the magnetic flux can be produced by the current in the windings 112, acting on the different branches with suitable dephasing.

The oscillation of the three columns of the liquid metal, heating and cooling the laminations of the three sections 111, can be assured, for instance, by three pistons with dephased action and magnetic winding, placed in the space under the junction of the three columns. This entrainment can be also effected by three dephased oscillators, with gas or vapor, described above, placed on the upper ends of the three columns, these columns having their cool lower ends joined in a common junction.

In the case of use of armatures polarized by application of a permanent magnet (for instance, Figs. 2 and 7) with bifurcation of the magnetic flux between different branches of the armature, the interruption of the magnetic flux in the branches dephased by 180°, will induce in the respective windings two alternating induction currents, equally dephased by 180°. It is possible to replace the permanent magnet by an electromagnet, the magnetic flux of which is maintained by superposition of currents produced in the two branches, and suitably rectified and oriented.

It is also possible to use unpolarized armatures, and to produce alternating current by two separate armatures, with only one transverse section for flux interruption in each, the current produced in one of these armatures, conveniently oriented and dephased, acting on the other, and vice versa, so as to maintain in these two armatures conveniently dephased and oriented variations of the magnetic flux, capable of varying in intensity and in direction. In the case when the magnetic flux is varying in direction, the thermic interruption of the flux will take place at each half-period of produced current.

An alternating current can also be produced by a generator with only one armature having only one interrupter section, the current induced by one flux interruption being used to produce a conveniently dephased current which will produce in the same armature a dephased magnetic flux of inverse direction, and so on. Such a dephased current can be obtained either by use of transformers, or by resonance oscillation, or other known means.

In general, means are provided by using several branches of armature, or several separate, but electrically interconnected, armatures, to transform thermic energy into known types of electric current. In conformity with the required current, these interconnections can be direct, or suitably dephased by suitable dephasing means, as transformers, self-induction, capacity, resonance oscillation, etc.

Where mention is made herein of heating the interrupter section or laminae thereof to temperatures "above the Curie point," it will be understood that heating to said point is all that is required in order to obtain the desired effects; the expressions "above" and "below" being used for convenience unless otherwise clearly intended.

It has been noted that the several ferromagnetic metals iron, nickel and cobalt have different Curie points. Advantage may be taken of this fact by using different materials in a series of two or more interrupter sections, with an arrangement of fluid circuits such that the heat removed by a cooling fluid from the section having the highest Curie point is used (with modification, if necessary) for heating the section with next lower Curie point, thus effecting a saving of thermal energy.

It will be understood that various changes may be made in the arrangement, form and construction of the several parts without departing from the spirit and scope of my invention and hence I do not intend to be limited to the details herein shown and described except as they may be included in the claims.

What I claim is:

1. The method of producing electrical and mechanical energy from thermal energy which includes, producing a magnetic flux in a closed armature of ferromagnetic material, alternately heating and cooling a transverse section of said armature above and below the Curie point of said material, whereby the permeability of said armature is interrupted and said magnetic flux is modulated in intensity, and thereby inducing in a winding of said armature an alternating electric current, the heating of the transverse section being effected by supplying thereto a fluid at a temperature above the Curie point, and the cooling of the section being effected by supplying thereto a fluid at a temperature below the Curie point, said fluids being passed alternately, with the desired frequency of alternation, through channels in said transverse section and being circulated continuously in separate closed circuits.

2. The method according to claim 1 in which the fluid in one circuit is passed through a heater and the fluid in the other circuit is passed through a cooler.

3. The method according to claim 1 in which the fluids are metallic.

4. The method according to claim 1 in which the fluids are selected from the group of sodium, potassium, sodium-potassium alloys and lithium.

5. The method according to claim 1 in which the fluids are selected from the group of rare gases and mixtures thereof under pressure.

6. A generator of the character described comprising, a polarized armature with a plurality of symmetrical branches, a transverse section of ferromagnetic material symmetrically disposed in each branch, a winding on each branch, and means for varying the temperature of each transverse section alternately above and below the Curie point of the material of said section, the temperature varying means comprising, at least one closed fluid circuit, hot and cold fluids therein, and means for bringing said fluids alternately into heat-exchange relation with said transverse section.

7. In a generator of the character described, a ferromagnetic armature and a transverse section therein, said section including thin elements of extended surface area having surface layers of ferromagnetic material adherently associated with an inner supporting layer of material having high mechanical resistance at elevated temperatures.

8. A thermomagnetic motor comprising a polarized armature with a plurality of symmetrical branches, a transverse section of ferromagnetic material symmetrically disposed in each branch, open-ended transverse sections disposed symmetrically in each branch so as to form a space for a moving rotor, means for varying the temperature of each transverse section of ferromagnetic material alternately above and below the Curie point of said material so as to form between the open-ended sections a rotating magnetic field, and an electric rotor mounted for rotation in the said space.

9. A thermomagnetic motor according to claim 8 in which the rotor space is located at a sufficient distance from the transverse sections of ferromagnetic material to permit maintaining the area of the field and rotor at a normal temperature.

CONSTANTIN CHILOWSKY.

REFERENCES CITED

The following references are of record in the file of this patent:

UNITED STATES PATENTS

| Number | Name | Date |
|---|---|---|
| 380,100 | Edison | Mar. 27, 1888 |
| 476,983 | Edison | June 14, 1892 |
| 1,556,183 | Viz | Oct. 6, 1925 |
| 2,016,100 | Schwarzkopf | Oct. 1, 1935 |